United States Patent [19]

Bruce

[11] 4,221,252

[45] Sep. 9, 1980

[54] LOCKING ARRANGEMENT PARTICULARLY FOR SHACKLES

[76] Inventor: Peter Bruce, "Le Victoria", App. 5e-etage-Bluc D, Princesse Charlotte, Monte Carlo, Monaco

[21] Appl. No.: 901,306

[22] Filed: Apr. 28, 1978

[30] Foreign Application Priority Data

Apr. 28, 1977 [GB] United Kingdom ............... 17717/77
Apr. 28, 1977 [GB] United Kingdom ............... 17718/77

[51] Int. Cl.² .......................................... F16B 39/02
[52] U.S. Cl. ......................................... 151/5; 59/86; 85/5 N; 403/155; 403/317
[58] Field of Search .................... 151/5, 6, 61–63, 151/66, 68, 28; 85/8.1, 8.3, 5 N; 59/86; 403/154, 155, 317

[56] References Cited

U.S. PATENT DOCUMENTS

| 140,715 | 7/1873 | Lahman | 59/86 X |
|---|---|---|---|
| 1,762,739 | 6/1930 | Phillips | 151/5 X |
| 1,858,039 | 5/1932 | Cooke | 151/5 |
| 2,279,681 | 4/1942 | Ilbery | 151/5 |
| 2,709,616 | 5/1955 | Larson et al. | 59/86 X |
| 3,115,355 | 12/1963 | Gardner | 151/5 X |
| 3,361,176 | 1/1968 | Jansen | 151/6 X |
| 3,375,749 | 4/1968 | Coldren et al. | 85/8.8 X |
| 3,504,590 | 4/1970 | Bedford | 85/8.8 X |
| 3,689,962 | 9/1972 | Erickson | 85/8.8 |

FOREIGN PATENT DOCUMENTS

| 855326 | 11/1960 | United Kingdom. | |
| 942166 | 11/1963 | United Kingdom. | |
| 988419 | 4/1965 | United Kingdom. | |
| 1264946 | 2/1972 | United Kingdom. | |
| 361322 | 1/1973 | U.S.S.R. | 151/5 |

Primary Examiner—Rodney H. Bonck
Attorney, Agent, or Firm—Mason, Fenwick & Lawrence

[57] ABSTRACT

A locking system for locking a nut on a threaded shaft comprises a transverse through aperture in the shaft alignable with through apertures in the nut, and a pin extending between the aligned through apertures to lock the nut against rotation relative to the shaft. According to the present invention displaceable wedge means are located in a recess of the shaft and engage the pin to lock the pin against axial displacement. These wedge means preferably comprise a plastics plug with a waisted through aperture, the pin including a complementary necked portion. The locking system can be advantageously used with the nut and bolt of a shackle.

8 Claims, 8 Drawing Figures

LOCKING ARRANGEMENT PARTICULARLY FOR SHACKLES

The present invention relates to a locking arrangement for locking a first member against movement relative to a second member. More specifically, the invention concerns the locking of a nut on a threaded shaft, and, particularly, for locking a shackle nut in a shackle.

It is a principal object of the present invention to provide a locking pin system for a shackle bolt which is easily removable.

It is a further object of the present invention to provide an improved shackle enabling easy and rapid connection by a single person, and which reduces the risk of wire rope damage on winch drums.

According to the present invention there is provided a locking arrangement for locking an annular member against movement on the end of a rod-like member, comprising an axial recess in said end of the rod-like member, aligned through-bores extending transversely in said rod-like member and opening into said axial recess, aperture means in said annular member alignable with said through-bores, a locking element located in said recess and including a waisted passage alignable with the through-bores, said passage including convex resilient walls defining throated wedge means, a pin insertable between the aperture means and the through-bores to locate the annular member, said pin having an annularly-symmetrical necked portion, which co-operates with said wedge means of the locking element to prevent axial displacement of the pin, the resilient walls of the locking element being deformable by the pin during pin insertion and pin removal, and means for positioning said locking element in an operative position.

Preferably the locking element is rotatable in the recess and is orientable onto the operative position by the insertion of the pin.

The plug can be made of plastics material, e.g. nylon. Embodiments of the present invention will now be described by way of example with reference to the accompanying drawings in which.

Figure 1:
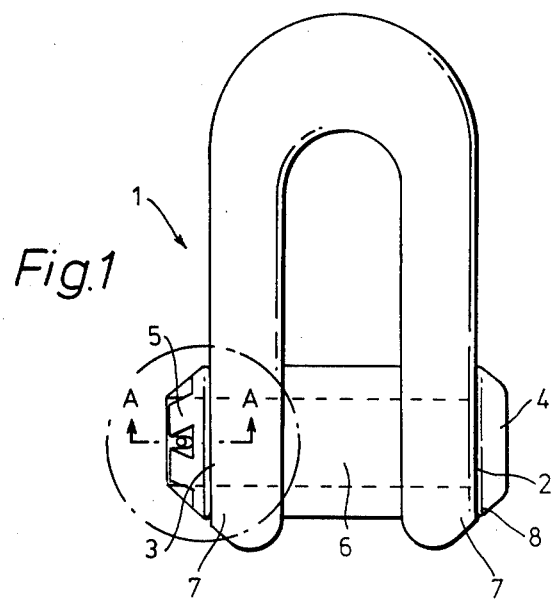
FIG. 1 shows a shackle and shackle bolt provided with a locking-pin arrangement according to the present invention.
Figure 2:
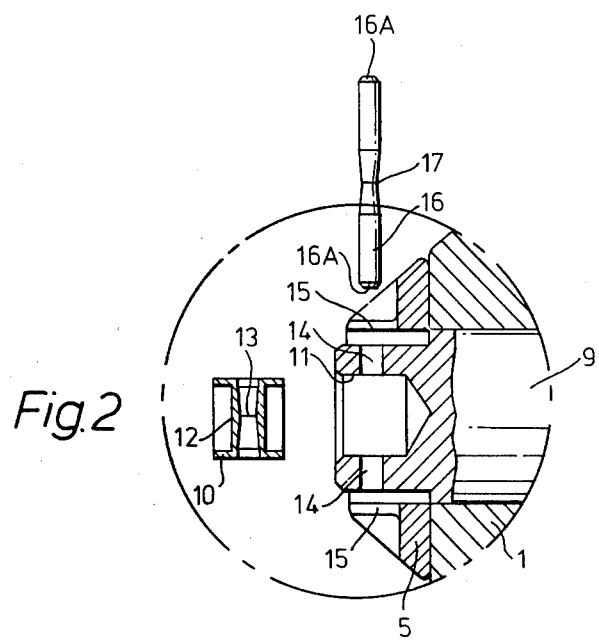
FIG. 2 shows a detail of the shackle and bolt of FIG. 1 in cross-section and to a larger scale.

Referring to FIGS. 1 and 2, a U-form shackle 1 has flat outward facing surfaces 2,3 to support a head 4 and nut 5 of a shackle bolt 6. The outer edges 7 of the shackle define 4 frusto-conical surfaces (of angle 45°-55°), and the nut 5 which is of castellated form and the bolt head 4 are of frusto-conical or rounded form to blend with surfaces 7. Additionally, a tang 8 on the shackle 1 serves to lock the bolt 6 against rotation. A locking arrangement is provided for locking the nut 5 on the threaded shaft 9 of the bolt 6 and includes a resilient plug 10 (FIG. 2) of plastics material, e.g. nylon and located in a blind axial bore 11 at one end of the shaft 9, and is rotatable by the pin 16 during insertion thereof for alignment, said plug 10, having a latter annular wall 12 providing a transversely extending waisted through aperture 13 which aligns with a transverse bore 14 on the shaft 9. The castellation of this nut 5 provides pairs of diametrally opposed transverse apertures 15 to receive a locking pin 16, and the opposed through apertures 15 of the nut 5 are alignable with the transverse aperture 13 of the plug. Additionally the pin 16 has a central necked portion 17 co-operating with the waisted portion of the plug 10 for axial locking of the pin 16.

For locking of the nut 5, the nut is screwed on the shaft 7 until a pair of opposed apertures 15 is aligned with the plugs transverse aperture 13. The pin 16 is then driven by means of, for example, a drift to extend from one aperture 15 of the nut through the plug aperture 13 to the opposed aperture 15 of the nut 5 whereby the nut 5 is locked against rotation. The waisted portion of the plug 10 is laterally displaced by the pin 16 as it is driven, but the portion subsequently springs into the necked portion 17 of the pin 16 to lock the pin 16 against axial displacement. The pin 16 can be removed by a similar driving operation.

Figure 3:
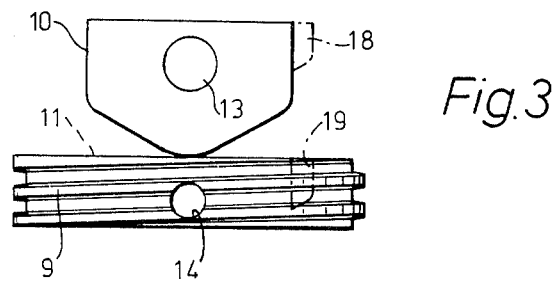
FIG. 3 shows an alternative form of locking plug to that shown in FIG. 2.

FIG. 3 shows an alternative form of plug of substantially solid form with the waisted aperture 13 extending through the solid plug. The plug includes a lateral ear 18 locatable in a recess 19 in the portion 9.

Figure 4:
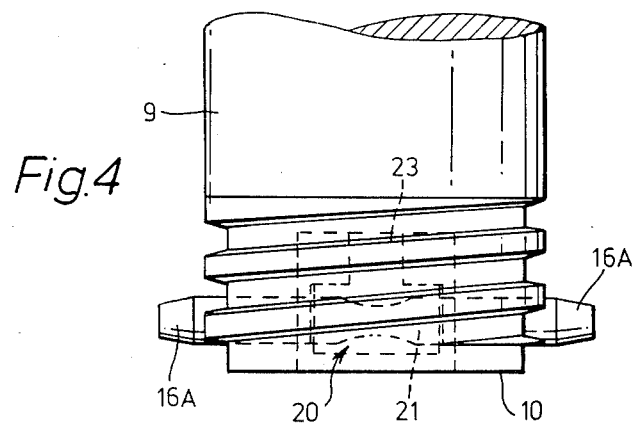
FIG. 4 shows alternative wedging means for use with a bolt locking pin, according to a second embodiment of the present invention.
Figure 5:
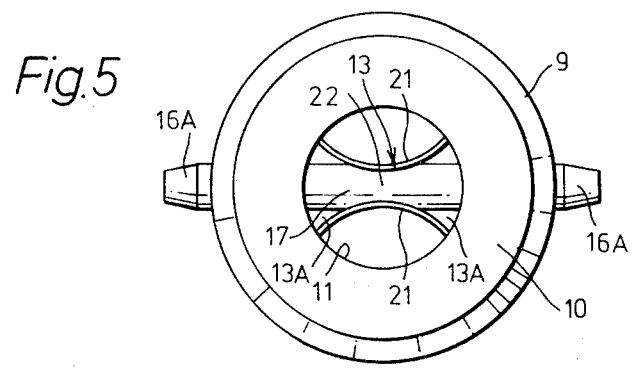
FIG. 5 shows an end view of the device of FIG. 4.
Figure 8:
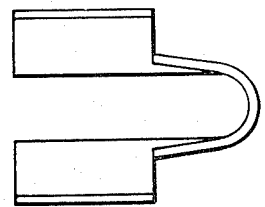
FIG. 8 shows a side view of the wedge means of FIG. 4.

Instead of a plastic plug, wedging means of metal form could be used for locking of the locking pin. FIGS. 4, 5 and 8 illustrate such wedging means 20 comprising a facing pair of convex plates 21 defining a throat 22 and joined by U-form tongue 23. The wedging means 20 is fitted into the recess 11, and is rotatable for alignment with the pin 16, the tongue 13 being innermost. The aperture 13 has diverging mouths 13A of greater diameter than the pin 16 whereby the pin can align the aperture 13 during insertion. To facilitate this operation, the pin has bevelled ends 16A. The locking arrangement is particularly useful for locking the nut of the shackle bolt, e.g. in conjunction with anchor systems, and the arrangement will be particularly beneficial in off-shore operations, e.g. on oil rigs. Heretofore, a split cotter pin has been used to lock the nut in a shackle bolt. As will be understood removal or insertion of such a pin requires bending of the pin and split pin removal can be difficult under the severe conditions that can be prevalent off-shore. The pin can readily jam in its bore during removal. In the present arrangement, pin removal is achieved by a straightforward driving operation and there is no bending of pins: the operation is consequently much simpler and more convenient.

Additionally, the smooth blending form of the shackle and shackle bolt will reduce the likelihood of wire rope snagging on the shackle.

Figure 6:
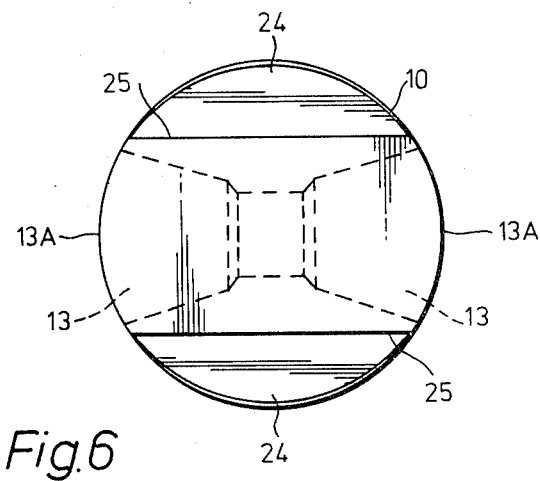
FIGS. 6 and 7 show another embodiment of the plug with FIG. 7 being an end view.
Figure 7:
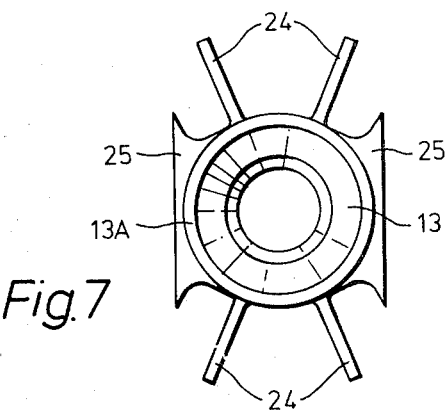

FIGS. 6 and 7 show a plug 10 operating in a substantially similar fashion to the plate elements 21 of FIGS. 4 and 5 but made of a plastics material with a waisted through bore expandably displaceable by the pin 16. The lugs 24 serve to locate the plug 10 in the bore 11 while flanges 25 facilitate removal of the plug from bore 11 by means of a levering tool, e.g. a screwdriver.

What I claim is:

1. A locking arrangement for locking an annular member against movement on the end of a rod-like member, comprising an axial recess in said end of the rod-like member, aligned through-bores extending transversely in said rod-like member and opening into said axial recess, aperture means in said annular member alignable with said through-bores, a locking element located in said recess and including a waisted passage alignable with the through-bores, said passage including convex resilient walls defining throated wedge means, a pin insertable between the aperture means and the through-bores to locate the annular member, said pin having an annularly-symmetrical necked portion, which co-operates with said wedge means of the locking element to prevent axial displacement of the pin, the resilient walls of the locking element being deformable by the pin during pin insertion and pin removal, and means for positioning said locking element in an operative position.

2. The locking arrangement according to claim 1 wherein the locking element is rotatable in the recess and is orientable into the operative position by insertion of the pin.

3. The locking arrangement according to claim 1, wherein the locking element is a resilient tubular plug and includes a transverse annular wall providing said waisted passage.

4. The locking arrangement according to claim 3, wherein the plug includes a lateral element co-operating with a corresponding slot in the first member to facilitate alignment of the waisted passage of the plug with the through aperture of the first member.

5. The locking arrangement, according to claim 3, wherein the plug is made of plastics material.

6. The locking arrangement, according to claim 1, wherein the locking element comprises a facing pair of convex metallic plate elements defining said throated wedge means, and a joining plate connecting said convex plate elements.

7. In combination a shackle comprising a U-form member; a bolt extending through facing through bore at the ends of the U and having a bolt head at one end and a threaded shaft portion at the other end; a nut for said threaded shaft portion to secure the bolt and including laterally extending facing through apertures; and a locking arrangement for the nut and bolt comprising a through aperture in said threaded shaft portion alignable with a through aperture of the nut, a locking element in an end recess of said threaded shaft portion and including an elongate passage having an elastically deformable wall defining wedge means, a pin insertable in the passage and deforming said wedge means, indent means being provided on the pin permitting said wedge means following deformation by the pin to spring back into locking engagement with said indent means to prevent axial displacement of the pin, and means for positioning said locking element in an operative position.

8. The combination of claim 7, wherein the nut and bolt head are of frusto-conical form and the U-form member includes a frusto-conical outer edge surface at each of its free ends blending with said frusto-conical nut and said bolt head respectively.

* * * * *